Patented May 7, 1946

2,400,016

UNITED STATES PATENT OFFICE 2,400,016

PRODUCTION OF SYNTHETIC RESIN COATINGS

Leonard S. Meyer, Toledo, Ohio, assignor to Libbey-Owens-Ford Glass Company, Toledo, Ohio, a corporation of Ohio No Drawing. Application July 11, 1945,
Serial No. 604,517

6 Claims. (Cl. 117—65)

The invention relates to the production of synthetic resin coatings, and in particular to the production of coatings of the urea resin type containing a finely divided cellulosic filler.

Urea-formaldehyde resin coatings have superior hardness and light resistance, and can be made transparent, pure white, or any other color desired, but they are of very limited usefulness because of their brittleness. The brittleness exhibited by urea-formaldehyde resin coatings, even when they contain cellulosic fillers, causes surface cracking of the coatings commonly known as "crazing" to occur after the coatings have been applied. The brittleness that causes such crazing is a fundamental limitation on the usefulness of urea-formaldehyde resin coatings.

The principal object of the invention is the production of coatings containing resinous reaction products of urea and formaldehyde that are non-brittle and craze-resistant. Other objects and advantages are apparent from the description, which discloses and illustrates the invention, and is not intended to impose limitations upon the claims.

Resins prepared by the reaction of formaldehyde with an aliphatic diurea have been found to be unsuitable for ordinary commercial use, because they have very poor water resistance. Articles molded from such resins suffer severe swelling, softening and splitting when left in contact with cold water for one day, and undergo marked swelling even upon exposure to a moist atmosphere. The addition of a urea-formaldehyde reaction product to an aliphatic diurea-formaldehyde reaction product does not produce a material improvement in the water resistance of articles molded from the composition.

The present invention is based upon the discovery that although articles molded from a composition containing intermediate reaction products of formaldehyde with urea and an aliphatic diurea do not have materially greater water resistance than articles molded from a similar composition containing intermediate reaction products of formaldehyde with an aliphatic diurea alone, a coating comprising finely divided cellulosic material and resinous reaction products of formaldehyde with urea and an aliphatic diurea has a very satisfactory water resistance, and a resistance to crazing that is greatly superior to that of a similar coating containing resinous reaction products of formaldehyde and urea alone. The addition of a urea-formaldehyde reaction product to a composition containing an aliphatic diurea-formaldehyde reaction product does not materially improve the water resistance of articles molded therefrom, but the water resistance of a coating containing finely divided cellulosic material and resinous reaction products of formaldehyde with urea and an aliphatic diurea is quite satisfactory. This difference in result is apparently due to the difference between the physical form of a surface coating of the resinous material and the physical form of a solid article of the resinous material.

A surface coating embodying the invention is unaffected by light, and the reaction products of formaldehyde with urea and an aliphatic diurea are colorless. A coating produced in accordance with the invention is not brittle, but is relatively flexible and is thus highly resistant to crazing.

The aliphatic diureas that may be used in carrying out the invention are diureido alkanes, in which the ureido group are separated by at least two carbon atoms, including polymethylene diureas, such as ethylene diurea, tetramethylene diurea, pentamethylene diurea, hexamethylene diurea, octamethylene diurea, decamethylene diurea, dodecamethylene diurea, pentadecamethylene diurea, and octadecamethylene diurea, and alkylene diureas, such as propylene diurea, 1,2-dimethyl ethylene diurea; and others, such as 1,10-dimethyl decamethylene diurea; di-ureidoalkyl ethers, such as beta,beta'-di-ureidoethyl ether and gamma,gamma'-di-ureidopropyl ether; di-ureidoalkyl thioethers, such as beta,beta'-di-ureidoethyl sulfide and gamma,gamma'-di-ureidopropyl sulfide; di-ureidoalkyl polythioethers, aliphatic polyamides having urea end-groups, and mono- and polyhydroxy derivatives of said compounds in which each hydroxy group is attached to a carbon atom to which no urea group is attached, such as 2-hydroxy trimethylene diurea. The chain of atoms between the ureido groups in these compounds may be as long as desired, and products made from diureas having long chains of atoms between the ureido groups usually have superior flexibility and toughness.

The reaction products of formaldehyde with urea and the reaction products of formaldehyde with the aliphatic diurea may be brought together in any desired manner, for example, by grinding the intermediate reaction products together in a ball mill. In the preferred method of producing mixed reaction products for use in carrying out the invention, formaldehyde is reacted with a mixture of urea and the diurea. However, a composition for use in carrying out the invention may be prepared by mixing reaction products of formaldehyde and urea with reaction products of formaldehyde and the diurea either in the form of a solution or in dry form.

In the preparation of reaction products for use in carrying out the invention, the urea or the diurea or a mixture thereof may be reacted with either formaldehyde or a polymer thereof, such as paraformaldehyde. Preferably they are reacted with a solution of formaldehyde in water, in an organic solvent, such as alcohol, or in a liquid containing both water and an organic solvent. An organic solution may be prepared by carrying out the reaction in an organic solvent such as methyl, ethyl, propyl or n-butyl alcohol, and the reaction may be performed in an autoclave, if desired, to secure a reaction temperature above the boiling point of the solvent.

When a formaldehyde solution is used for the reaction, the solution is preferably about neutral at the start of the reaction. Since commercial formaldehyde solution is strongly acid, a base is preferably added to bring the initial pH of the reaction solution to the desired value. Any desired base may be employed. The preferred proportions are 2 mols of formaldehyde for each mol of the diurea, and 3 mols of formaldehyde for each 2 mols of urea. Approximately 2 mols of formaldehyde is the maximum that will react with 1 mol of urea or an aliphatic diurea, but an excess of formaldehyde above that maximum or a smaller proportion ranging down to 1 mol of formaldehyde for each mol of urea or the diurea may be used for the reaction, if desired. Because of the complexity of the molecules of the reaction products that are produced, the proportion of formaldehyde actually reacting with the urea or the diurea may vary freely between the limits stated.

The reactions proceed at ordinary temperatures, but heat may be employed to expedite the dissolving of the urea and the diurea and to speed the reaction. Intermediate reaction products may be prepared by carrying the reaction of the formaldehyde with the urea or the diurea, or the mixture thereof, only to its earliest stage, for example, the stage at which the reacting ingredients have just dissolved to form a solution, or the reaction or condensation may be carried to any further stage (short of the final infusible stage) at which the products may still be called intermediate reaction products. By thus advancing the reaction, it is possible to obtain intermediate reaction products that are insoluble but are still fusible. In accordance with the invention, the intermediate reaction products so prepared may be applied in the form of a coating containing finely divided cellulosic material, and then converted into infusible resinous reaction products.

In the preferred method of preparing intermediate reaction products for use in practicing the invention, an aqueous solution containing initial reaction products of formaldehyde with urea and an aliphatic diurea is used to impregnate cellulosic material, such as alpha-cellulose fiber, wood pulp, paper pulp, wood flour, or the like. The cellulosic material should be well shredded at the time of impregnation to insure that the fibers are uniformly penetrated by the solution. In the next step of the preferred method of preparing a coating composition for use in practicing the invention, the impregnated cellulosic material is dried. Heat may be used to expedite the drying of the impregnated cellulosic material but, of course, the drying temperature should not be sufficient to render the reaction products infusible. Condensation of the reaction products with splitting off of water takes place during the drying operation.

The product of the drying operation may then be ground to a fine powder in a ball mill or similar apparatus. During the grinding opacifiers, dyestuffs, pigments or other coloring matter and plasticizers, lubricants and accelerators or retarders of hardening may be added, if desired.

The weight of cellulose in the product of the drying operation may vary from one-third to twice the weight of reaction products of formaldehyde with urea and the diurea, but the preferred proportion of cellulose in such a product is from about 30 to about 50 per cent by weight. If no pigment or opacifier is incorporated in the composition, a surface coating produced from the composition is quite transparent because it is relatively thin and because the cellulose has only a relatively slight opacifying effect.

In order to prepare a composition suitable for application as a coating, a fine powder prepared as described above may be mixed with a liquid vehicle and stirred. A convenient method of mixing is to grind the powder and liquid together in a ball mill. A volatile organic solvent such as an alcohol or hydrocarbon may be employed as the liquid vehicle, but the preferred liquid is water.

When the powder is mixed with water, some of the reaction products dissolve in the water unless the reaction has been carried so far that the reaction products are no longer capable of dissolving in water. Usually most of the reaction products dissolve in the water so that the composition produced by mixing the powder and water consists of cellulose particles impregnated with a small fraction of the weight of reaction products, suspended in an aqueous solution of reaction products of formaldehyde with urea and the diurea. The dissolving that takes place is believed to be due largely to hydrolysis. The proportion of water or other liquid vehicle is simply the amount that gives a suspension having a consistency suitable for the particular method that is to be used for applying the suspension.

The impregnation of the cellulosic material with the reaction products of formaldehyde with urea and the diurea prior to the grinding operation makes the cellulose brittle and thus greatly facilitates the reduction of the cellulosic material to a fine powder by grinding.

When the resulting powder is mixed with water, although most of the reaction products may dissolve in the water, there is always a certain proportion of the reaction products that remains in the cellulose particles and fails to dissolve. The residual portion of the reaction products with which the suspended cellulose particles are still impregnated greatly reduces the absorbency of the cellulose particles. The reduced absorbency of the cellulose particles in the suspension is advantageous because it entails a reduction in the tendency of the cellulose particles to form a solid cake by absorbing the liquid vehicle and thus makes it possible to obtain a suspension thin enough for ready application by use of a relatively small proportion of liquid vehicle. Since the impregnated cellulosic particles do not absorb the liquid vehicle, they do not swell up and the suspension is therefore relatively free-flowing and does not clog a spray-nozzle used in applying the suspension.

In practicing the invention, the coating composition may be applied by spraying, brushing, roll-coating, or any other suitable method, and the coating so applied may then be dried. A coating embodying the invention may be applied to a large variety of bodies ranging from thin sheets to heavy boards or plates. The coating may be applied to wood, paper, corn protein sheets, pressed wood fiber sheets, sheets of cellulose fiber impregnated with a synthetic resin, and the like.

A useful application of the present method of coating consists in applying the coating composition to one side of a sheet of laminating stock, such as a sheet of cellulose fiber impregnated with a phenol formaldehyde resin. The coated sheet is then assembled with a stack of uncoated sheets, the coating being on the outside, and the stack of sheets is pressed between heated plates. During this operation, the phenol formaldehyde resin with which the sheets are impregnated is converted to the infusible state. The finished product has the high water resistance that is characteristic of phenol formaldehyde resins. The coating containing resinous reaction products of formaldehyde with urea and an aliphatic diurea, because of its thinness, also is unaffected by exposure to moisture. The coating imparts further desirable properties to a body so produced because the coating can be made pure white or any other light shade desired, and is not discolored by exposure to sunlight. It is advantageous to have a coating of such properties which completely conceals the phenolic resin in the interior of the body, because the phenolic resin has an unattractive brown color and would be further discolored by exposure to the light.

In the last step of the present method of producing a coating, the layer comprising finely divided cellulosic material and intermediate reaction products of formaldehyde with urea and an aliphatic diurea is finished by hot-pressing. Upon application of a hot plate to such a coating layer, the layer first softens into a homogeneous mass and is forced by the applied pressure into the interstices of the underlying surface. At the same time, the outer surface of the coating acquires the same smoothness and polish as the hot plate that is pressed upon it. At the elevated temperature, the reaction products harden into an infusible, insoluble resin.

The speed of hardening of the reaction products during this step is proportional to the acidity of the coating while it is subjected to the elevated temperature and pressure, since acid acts as a catalyst to accelerate the hardening. The acidity of the coating at this stage is determined by the proportions of accelerators and retarders used in the coating composition. The degree of acidity employed during the hardening of the intermediate reaction products in the coating may vary widely, and is simply that acidity which causes the reaction products to harden at the desired rate.

When pigments or opacifiers are employed, the opacity of a coating layer embodying the invention is such that the color of the underlying body does not show through even when a black body is covered by a very light colored coating. If no pigments or opacifiers are employed, the finished coating is substantially transparent and can be used as a transparent portective covering for ornamental surfaces.

Of course, the body upon which the coating is applied should be of a material that is not harmed by the heat and pressure used in finishing the coating. An advantage of the present coating is that it may be finished by application of the same conditions of heat and pressure that are employed in forming laminated board from sheets of cellulosic fiber impregnated with a phenol formaldehyde resin. It is this property of the coating composition that makes it possible to form the laminated board and the surface coating in a single hot-pressing operation. It is not possible to subject such laminated board to more than one hot-pressing operation because the second hot-pressing operation is harmful and results in defective products.

The reaction products of formaldehyde in a coating embodying the invention may include any proportion, such as 5 per cent, of urea-formaldehyde reaction products that is sufficient to produce an appreciable improvement in the water resistance of the finished coating, and any proportion, such as 5 per cent, of aliphatic diurea-formaldehyde reaction products that is sufficient to produce an appreciable improvement in the craze-resistance of the finished coating. A coating, produced in the manner that has been described, from which the reaction product of formaldehyde with the aliphatic diurea has been omitted, because of its brittleness, is subject to cracking and crazing with any slight change in the dimensions of the coated body. The present invention makes it unnecessary to have close control of changes in moisture conditions which might cause shrinkage of the coated body.

In a comparative test, a laminated body consisting of a cellulosic fiber impregnated with a phenol formaldehyde resin and having a coating consisting of finely divided cellulosic material and a resinous urea-formaldehyde reaction product was subjected alternately to a dry atmosphere and an atmosphere saturated with moisture for successive periods of 24 hours each. This treatment caused crazing to occur after 4 days. A laminated body which was identical except that it had a surface coating containing in addition a resinous reaction product of formaldehyde and ethylene diurea was subjected to the same treatment for several times as long without showing crazing.

In preparing a coating composition for use in practicing the invention, equal mols of urea and the diurea may be employed or the proportion may be varied on either side of that ratio to prepare compositions adopted for various uses. If it is necessary to produce a composition having unusually high water resistance, the proportion of the urea-formaldehyde reaction products to diurea-formaldehyde reaction products may be substantially inceased, with some sacrifice in craze resistance.

*Example*

146 grams (1 mol) of ethylene diurea (or an equivalent amount of propylene diurea, triglycol diurea, or 2-hydroxy trimethylene diurea), 120 grams (2 mols) of urea, 405 grams (5 mols) of a 37 per cent aqueous solution of formaldehyde, together with a sufficient quantity of triethanolamine to produe a neutral solution, are held at 60° C. for 30 minutes. The solution is then mixed with 250 grams of alpha-cellulose fiber and sufficient phthalic acid to produce a pH of about 6. The impregnated cellulose is subjected to a stream of air at 170° F. until dry, and is then ground in a ball mill with the usual additions consisting of pigment, accelerator and lubricant. The resulting powder is ground in a ball mill with about 3 times its weight of water to produce a suspension in the form of a thin batter. After the suspension has been applied by spraying upon the surface to be coated, the coating is dried, then finished by hot-pressing.

Various embodiments of the invention may be devised to meet various requirements.

This is a continuation-in-part of application Ser. No. 454,549, filed August 12, 1942.

Having described the invention, I claim:

1. A method of coating a surface that includes applying a suspension comprising a volatile liquid vehicle, finely divided cellulosic material, and intermediate reaction products of formaldehyde with urea and a substance selected from the group consisting of diureido alkanes in which the ureido groups are separated by at least two carbon atoms, di-ureidoalkyl ethers, di-ureidoalkyl polyethers, di-ureidoalkyl thioethers, di-ureidoalkyl polythioethers, aliphatic polyamides having urea end-groups connected through a carbon chain, and mono- and polyhydroxy derivatives of said compounds in which each hydroxy group is attached to a carbon atom to which no urea group is attached, and finishing the resulting coating by hot-pressing.

2. A method of coating a surface that includes applying an aqueous suspension comprising finely divided cellulosic material and intermediate reaction products of formaldehyde with urea and a substance selected from the group consisting of diureido alkanes in which the ureido groups are separated by at least two carbon atoms, di-ureidoalkyl ethers, di-ureidoalkyl polyethers, di-ureidoalkyl thioethers, di-ureidoalkyl polythioethers, aliphatic polyamides having urea end-groups connected through a carbon chain, and mono- and poly-hydroxy derivatives of said compounds in which each hydroxy group is attached to a carbon atom to which no urea group is attached, drying the resulting coating, and finishing the coating by hot-pressing.

3. A method of coating a surface that includes applying a suspension comprising a volatile liquid vehicle, finely divided cellulosic material, and intermediate reaction products of formaldehyde with urea and ethylene diurea, and finishing the resulting coating by hot-pressing.

4. A method of coating a surface that includes applying an aqueous suspension comprising finely divided cellulosic material, and intermediate reaction products of formaldehyde with urea and ethylene diurea, drying the resulting coating, and finishing the coating by hot-pressing.

5. A body having a water-resistant and craze-resistant coating comprising finely divided cellulosic material and resinous reaction products of formaldehyde with urea and a substance selected from the group consisting of diureido alkanes in which the ureido groups are separated by at least two carbon atoms, di-ureidoalkyl ethers, di-ureidoalkyl polyethers, di-ureidoalkyl thioethers, di-ureidoalkyl polythioethers, aliphatic polyamides having urea end-groups connected through a carbon chain, and mono- and poly-hydroxy derivatives of said compounds in which each hydroxy group is attached to a carbon atom to which no urea group is attached.

6. A body having a water-resistant and craze-resistant coating comprising finely divided cellulosic material and resinous reaction products of formaldehyde with urea and ethylene diurea.

LEONARD S. MEYER.